United States Patent
Suzuki et al.

(10) Patent No.: US 6,335,052 B1
(45) Date of Patent: Jan. 1, 2002

(54) METHOD OF PRODUCING ALUMINA PARTICLES

(75) Inventors: Hiroshi Suzuki; Tatsuya Kato, both of Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/487,294

(22) Filed: Jan. 19, 2000

(30) Foreign Application Priority Data

Jan. 20, 1999 (JP) .......................................... 11-012245

(51) Int. Cl.[7] .............................................. B01J 13/02
(52) U.S. Cl. .............................. 427/213.3; 427/213.31; 427/223; 528/481; 528/503; 428/402; 428/403; 428/404; 428/406; 428/407
(58) Field of Search .................. 427/213.3, 213.31, 427/223; 528/481, 503; 428/402, 403, 404, 406, 407

(56) References Cited

U.S. PATENT DOCUMENTS 4,917,857 A 4/1990 Jaeckel et al. .................. 419/9

FOREIGN PATENT DOCUMENTS

JP 52-50987 4/1977

*Primary Examiner*—Samuel A. Acquah
(74) *Attorney, Agent, or Firm*—Sughrue Mion, PLLC

(57) ABSTRACT

Size-enlarged sludge particles 12 having nuclei of objective particles and having a particle size in a range of from 1 μm inclusive to 2000 μm exclusive are mixed with slurry containing fine alumina powder so that a mixture is prepared. Then, the mixture is dried by removal of the water content in the mixture. Then, the mixture is baked at a temperature in a range of from 1200° C. to 1500° C. so that alumina on surfaces of the size-enlarged sludge particles 12 are sintered. By the aforementioned method, light-weight alumina particles can be produced with the particle size controlled well to a uniform value.

11 Claims, 3 Drawing Sheets

METHOD OF PRODUCING ALUMINA PARTICLES

BACKGROUND OF INVENTION

1. Field of Invention

The present invention relates to a method of producing light-weight alumina particles. The light-weight alumina particles can be used for aggregate materials, refractory brick materials, electrically conducting materials, heat-conducting materials, and so on.

2. Related Art

As the background-art method of producing light-weight alumina particles, there is a method in which high-pressure air is blown on molten alumina ($Al_2O_3$) so that alumina particles 1 having hollow portions 1A as shown in FIG. 5 are produced (JP-A-52-50987). The hollow alumina particles formed by blowing air in the aforementioned manner has a particle size in a range of from 200 μm to 4000 μm in accordance with the physical properties, or the like, of the molten alumina.

The particle size of the alumina particles produced by the aforementioned method was, however, ununiform in a range of from 2000 μm to 4000 μm. That is, it was difficult to control the particle size of the alumina particles to be produced. Further, in the method of producing alumina particles by blowing high-pressure air, there was a problem that it was impossible to form alumina particles having a smaller particle size than 2000 μm.

Particularly, the particle size of alumina particles has an influence on mechanical strength. If the particle size of alumina particles is not smaller, for example, than 2000 μm, interparticle gaps become so large that the mechanical strength is reduced. If the particle size of alumina particles is contrariwise too small, the fluidity of particles becomes so low that moldability is worsened. Further, if the particle size is small, the density of particles becomes so high that light weight is not achieved.

It is, therefore, important to set the particle size of alumina particles at a predetermined value smaller than 2000 μm and make the alumina particles uniform at the predetermined particle size for the purpose of using the alumina particles for aggregate materials, refractory brick materials, and so on, requiring great mechanical strength.

SUMMARY OF INVENTION

The problem to be solved by the present invention is what means should be taken to obtain a method of producing light-weight alumina particles with the particle size controlled well to be made uniform.

According to a first aspect of the present invention, there is provided a method of producing light-weight alumina particles, comprising the steps of: preparing a mixture of core particles which are formed from a light-weight material so as to be used as nuclei of objective particles and so as to have a particle size in a range of from 1 μm inclusive to 2000 μm exclusive and slurry which contains fine alumina powder; drying the mixture by removing water content of the mixture; and baking the dried mixture at a temperature in a range of from 1200° C. to 1500° C. to thereby sinter alumina on surfaces of the core particles.

In a first aspect of the present invention, the particle size of the core particles as nuclei of objective particles, that is, of light-weight alumina particles, is set at a value in a range of from 1 μm inclusive to 2000 μm exclusive, so that the particle size of the light-weight alumina particles after baked can be set at a value smaller than 2000 μm. Accordingly, in the case of using the light-weight alumina particles as aggregate materials or light-weight brick materials, the great mechanical strength can be ensured. Further, because the particle size of the light-weight alumina particles is set at 1 μm or more, the high fluidity for molding can be ensured.

According to a second aspect of the present invention, in the method of producing light-weight alumina particles of the first aspect of the present invention, the core particles are size-enlarged sludge particles. In this invention, use of size-enlarged sludge particles as the core particles makes it possible to form light-weight alumina particles and reduce the cost of production. Further, in this invention, an attempt to use sludge can contribute to solution of environmental problems.

According to a third aspect of the present invention, in the method of producing light-weight alumina particles of the first aspect of the present invention, the particle size of the core particles, that is, of the size-enlarged sludge particles are set at a value in a range of from 1 μm to 1000 μm. In this invention, the particle size of the core particles constituted by the size-enlarged sludge particles is set at a value in a range of from 1 μm to 1000 μm, so that the ratio of the weight of the size-enlarged sludge particles in the objective particles (light-weight alumina particles) is lowered. Accordingly, the specific gravity of the objective particles is reduced so that the weight of the same is reduced.

According to a fourth aspect of the present invention, in addition to the effect of the first aspect of the present invention, the specific gravity of the light-weight alumina particles can be reduced more effectively so that the weight of the objective particles can be reduced more largely because the core particles are constituted by small resin balls or styrene foam particles which are low in specific gravity.

According to a fifth aspect of the present invention, in the method of producing light-weight alumina particles of the fourth aspect of the present invention, the particle size of the core particles is in a range of from 20 μm inclusive to 2000 μm exclusive. In this invention, light-weight alumina particles using small resin balls or styrene foam particles as the core particles and having a particle size of 2000 μm or less can be produced.

According to a sixth aspect of the present invention, in the method of producing light-weight alumina particles of any one of the first to fifth aspect of the present invention, the core particles are left as residues in the inside of resulting particles after the baking. In this invention, the core particles are left as residues in the inside of the objective particles, so that substantial reduction of the weight of the core particles can be achieved. Accordingly, the specific gravity of the objective particles (light-weight alumina particles) can be reduced more effectively. Further, the core particles are left as residues in the inside of the objective particles, so that the great mechanical strength can be ensured.

According to the seventh aspect of the present invention, in the method of producing light-weight alumina particles of fourth or fifth aspect, the core particles are left as small resin balls or as foam particles in the inside of resulting particles after the baking. In this invention, the core particles are left as small resin balls or as foam particles, so that the specific gravity of the objective particles can be reduced.

According to an eighth aspect of the present invention, in the method of producing light-weight alumina particles of any one of the first through the seventh aspect, the thickness of sintered alumina on the surfaces of the core particles is in a range of from 1 μm to 200 μm. In this invention, the thickness of sintered alumina is set at a value in a range of from 1 μm to 2000 μm, so that the great mechanical strength of the objective particles can be ensured. Incidentally, the thickness of sintered alumina can be controlled by adjustment of the amount of fine alumina powder contained in the slurry.

DETAILED DESCRIPTION OF PREFERRED EMBODIMENTS

A method of producing light-weight alumina particles according to the present invention will be described below in detail on the basis of embodiments thereof.

First Embodiment

Figure 1:
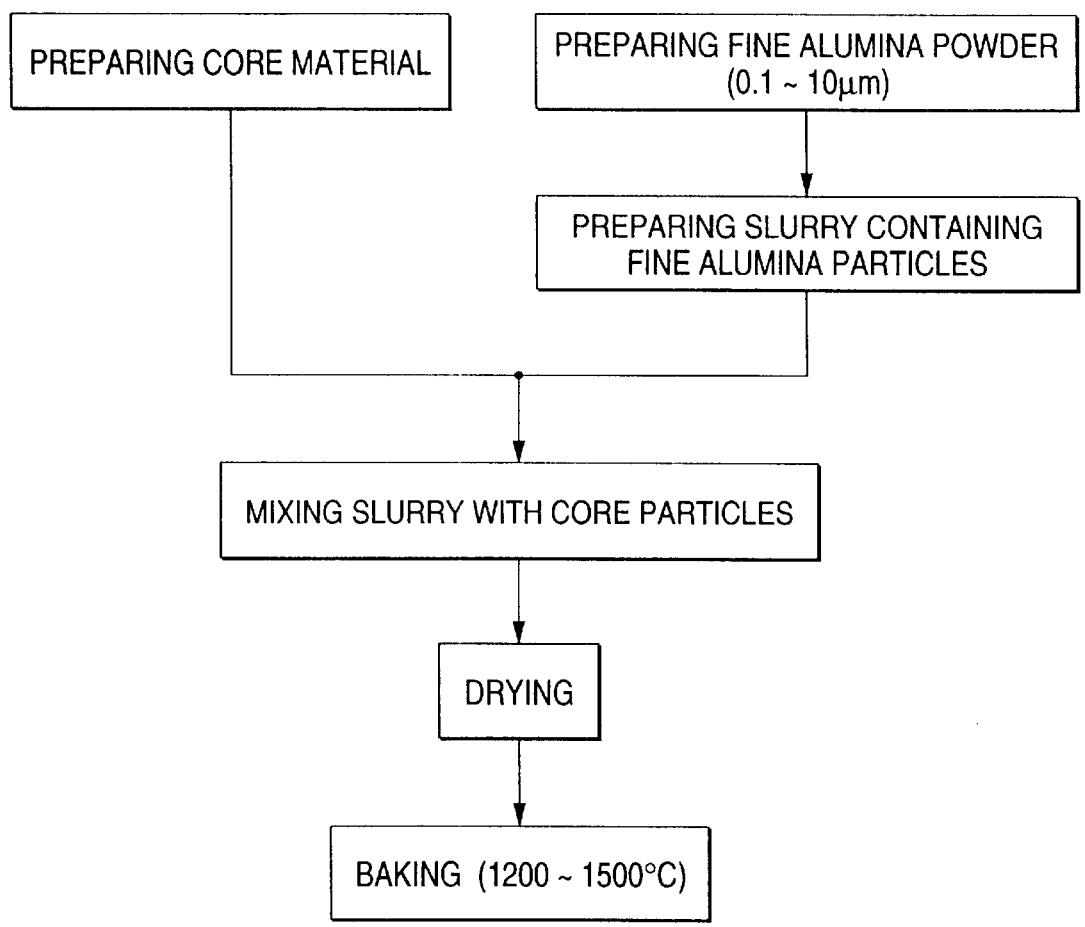
FIG. 1 is a flowchart showing First embodiment of the method of producing light-weight alumina particles according to the present invention.

FIG. 1 is a flowchart showing the steps in a method of producing light-weight alumina particles according to First embodiment. As shown in FIG. 1, in this First embodiment, size-enlarged sludge particles are prepared as core particles of light-weight alumina particles. The particle size of the size-enlarged sludge particles is set at a predetermined value in a range of from 1 μm to 1000 μm. Incidentally, the size-enlarged sludge particles are fine particles produced by size-enlargement of collected sludge.

On the other hand, fine alumina powder to be sintered is prepared. The particle size of this fine alumina powder is set at a suitable value in a range of from 0.1 μm to 10 μm. Then, slurry containing the fine alumina powder is prepared. The amount of the fine alumina powder contained in the slurry is set at a suitable value in accordance with the thickness of an alumina layer to be formed when the fine alumina powder is sintered. When, for example, an alumina layer having a small film thickness is to be formed, slurry containing a small amount of fine alumina powder is prepared. When, on the other hand, the thicker alumina layer is to be formed, slurry containing a large amount of fine alumina powder is prepared.

Next, the slurry containing fine alumina powder is mixed with the size-enlarged sludge particles which are core particles by using a slurry attachment apparatus so that a mixture is prepared. Thereafter, the water content of the mixture is dried.

The mixture in which the water content is removed and alumina are attached on the size-enlarged sludge particles in the aforementioned manner is baked in a baking furnace. The temperature for this baking is set at a suitable value in a range of from 1200° C. to 1500°C.

Incidentally, in this First embodiment, alumina produced by a method called Bayer process is used as the fine alumina powder. The Bayer process comprises the steps of: wet-decomposing bauxite by sodium hydroxide (NaOH) to thereby extract the $Al_2O_3$ content from the bauxite; hydrolyzing the $Al_2O_3$ content to thereby recrystallize $Al(OH)_3$; and thermally dehydrating $Al(OH)_3$ at a temperature of 1200° C. or more to thereby produce α-$Al_2O_3$. About 99% of alumina produced by the Bayer process has a particle size of about 40 μm, and contains about 0.5% of $Na_2O$. In this embodiment, therefore, a special treatment is further applied so as to perform baking for a long time so that the $Na_2O$ content is reduced to 0.04% or less. Further, a pulverizer having high pulverizing efficiency is used so that the particle size is set at a value in a range of from 0.1 μm to 10 μm. Incidentally, α-alumina is ceramics which is very stable at a high temperature.

Figure 2:
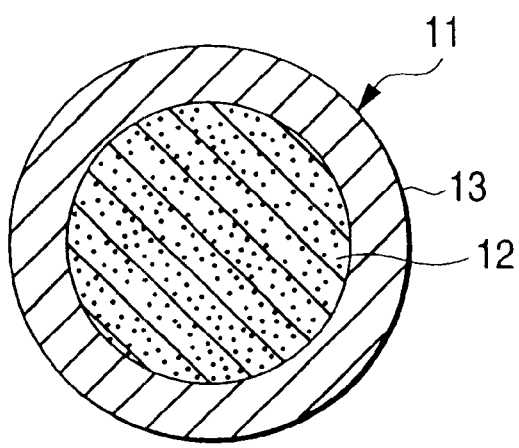
FIG. 2 is a sectional view of one of light-weight alumina particles produced by the producing method according to the first embodiment.

As a result of execution of the producing method according to this embodiment, light-weight alumina particles 11 as shown in FIG. 2 are obtained. In each of the light-weight alumina particles 11, a size-enlarged sludge particle 12 is formed as a nucleus (core) of the light-weight alumina particle 11 in the inside thereof. Further, an alumina layer 13 of sintered α-alumina is formed on a surface of the size-enlarged sludge particle 12. In this embodiment, the particle size of the light-weight alumina particles 11 can be controlled so as to be a value in a range of from 2 μm to 2200 μm. If, for example, the particle size of the size-enlarged sludge particles 12 is selected to be in a range of from 1 to 1000 μm, the thickness of the alumina layer 13 can be controlled to be in a range of from 1 μm to 200 μm. On this occasion, the thickness of the alumina layer 13 can be controlled by changing the amount of alumina contained in the slurry, by changing the baking temperature within a range of from 1200° C. to 1500° C. or by setting the baking time suitably.

The particle size of the light-weight alumina particles 11 has an influence on mechanical strength. If the particle size of the light-weight alumina particles 11 is selected to be a large value not smaller, for example, than 2000 μm, inter-particle gaps become so large that the mechanical strength is lowered. If the particle size of the light-weight alumina particles 11 is contrariwise too small, the fluidity of the particles becomes so low that moldability is worsened. Further, if the particle size is too small, the density of the particles becomes so high that light weight cannot be achieved. It is, therefore, important to set the particle size of light-weight alumina particles at a predetermined value smaller than 2000 μm and to make the alumina particles uniform at the predetermined particle size for the purpose of using the alumina particles as aggregate materials, refractory brick materials, and so on, which require great mechanical strength.

In this first embodiment, light-weight alumina particles 11 with the particle size controlled so well as to be a uniform value can be obtained by execution of the aforementioned procedure.

Second Embodiment

Next, description will be made about Second embodiment of the method of producing light-weight alumina particles according to the present invention. In this Second embodiment, styrene foam particles are prepared as the core particles of light-weight alumina particles. The particle size of the styrene foam particles is set at a predetermined value in a range of from 20 μm to 2000 μm. Further, fine alumina powder to be sintered is prepared. The particle size of the fine alumina powder is set at a suitable value in a range of from 0.1 μm to 10 μm in the same manner as in First embodiment. Then, slurry containing fine alumina powder is prepared in the same manner as in the First embodiment.

Then, the slurry containing fine alumina powder is mixed with the styrene foam particles as core particles by a slurry attachment apparatus so that a mixture is prepared. Thereafter, the water content of the mixture is dried.

The mixture containing alumina deposited on the styrene foam particles by removal of the water content in the aforementioned manner is baked in a baking furnace. The temperature in this baking is set at a suitable value in a range of from 1200° C. to 1500° C. As a result, light-weight alumina particles having a particle size in a range of from about 20 μm to about 2200 μm can be produced.

Figure 3:
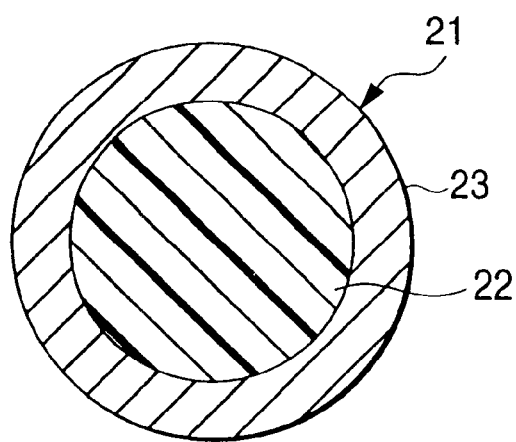
FIG. 3 is a sectional view of one of light-weight alumina particles produced by a producing method according to another second embodiment.
Figure 4:
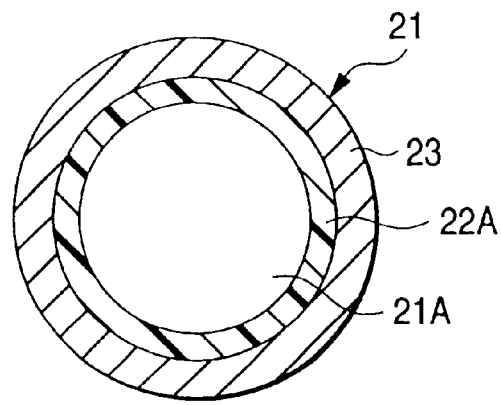
FIG. 4 is a sectional view showing a modification of the Second embodiment.
Figure 5:
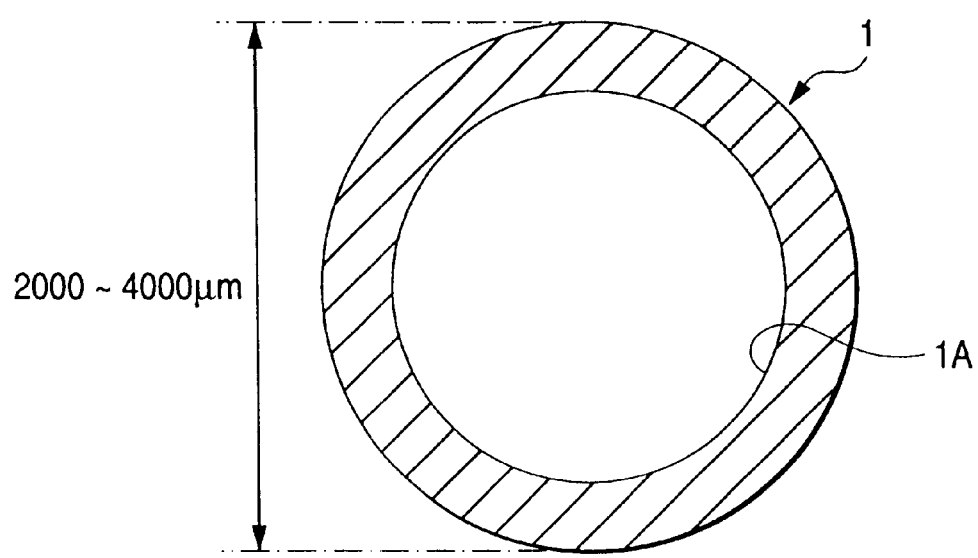
FIG. 5 is a sectional view of one of background-art light-weight alumina particles.

FIG. 3 shows one of light-weight alumina particles 21 produced in this Second embodiment. In the light-weight alumina particle 21, a styrene foam particle 22 is formed in the inside and an alumina layer 23 is formed on the surface of the styrene foam particle 22. The specific gravity of the light-weight alumina particles 21 produced in this Second embodiment is small (1 or less) because the inside of each of the light-weight alumina particles 21 is constituted by the styrene foam particle 22. Accordingly, the light-weight alumina particles 21 produced in this Second embodiment can be used as lighter-weight aggregate materials or lighter-weight refractory brick materials. Although this Second embodiment shows the case where light-weight alumina particles 21 are produced such that a styrene foam particle 22 is left in the inside of each of the light-weight alumina particles 21 without changing the volume of the styrene foam particle 22, the present invention can be applied also to the case where light-weight alumina particles 21 each having a gap 21A in its inside are produced by setting the baking temperature suitably so that a residue 22A of a styrene foam particle 22 is left as a residue 22A in the inside of each of the light-weight alumina particles 21 as shown in FIG. 4.

Although the Embodiments 1 and 2 have been described above, the present invention is not limited thereto and various changes may be made with respect to the gist of the configuration. For example, though particles each having the alumina layer 13 or 23 formed on its surface are formed in the Embodiments 1 and 2, a film of an electrically conductive material may be further formed on a surface of the alumina layer 13 or 23 by producing a light-weight electrically conductive material. Further, a film of a high heat-conductive material may be deposited/formed on a surface of the alumina layer 13 or 23 in producing a light-weight heat-conductive material. Although the embodiments 1 and 2 have shown the case where size-enlarged sludge particles 12 or styrene foam particles 22 are used as core particles, the present invention is not limited thereto and can be applied also to the case where another synthetic resin or another light-weight inorganic material is used.

As is obvious from the above description, according to the present invention, the particle size of the light-weight alumina particles after baked can be set at a value smaller than 2000 μm. Accordingly, in the case of using the light-weight alumina particles as aggregate materials or light-weight brick materials, the great mechanical strength can be ensured. Further, in the invention, because the particle size of the light-weight alumina particles can be set desirably, the high fluidity for molding can be ensured.

According to the present invention, the particle size of the core particles constituted by the size-enlarged sludge particles is set at a value in a range of from 1 μm to 1000 μm, so that the ratio of the weight of the size-enlarged sludge particles in the objective particles (light-weight alumina particles) is lowered. Accordingly, the specific gravity of the objective particles can be reduced. Further, sludge can be used effectively. This can contribute to solution of environmental problems.

According to the present invention, the specific gravity of the light-weight alumina particles can be reduced so that the weight of the objective particles can be reduced because the core particles are constituted by small resin balls or styrene foam particles which are low in specific gravity. Incidentally, when small resin balls or styrene foam particles are used as the core particles as described above, improvement of the mechanical strength can be achieved by thickening the alumina layer formed by sintering.

According to the present invention, light-weight alumina particles using small resin balls or styrene foam particles as the core particles and having a particle size of 2000 μm or less can be produced. Accordingly, light-weight alumina particles excellent both in mechanical strength and in moldability can be provided.

According to the present invention, the core particles are left as residues in the inside of the objective particles, so that substantial reduction of the weight of the core particles can be achieved. Accordingly, the specific gravity of the light-weight alumina particles can be reduced more effectively. Further, the core particles are left as residues in the inside of the objective particles, so that the great mechanical strength can be ensured.

According to the present invention, the core particles are left as small resin balls or as foam particles, so that the specific gravity of the light-weight alumina particles can be reduced and the mechanical strength can be improved.

According to the present invention, the thickness of sintered alumina is set at a value in a range of from 1 μm to 2000 μm, so that the great mechanical strength of the objective particles can be ensured.

What is claimed is:
1. A method of producing alumina particles, comprising the steps of:
preparing a mixture of:
(A) core particles, which are formed from a material used as nuclei of said alumina particles, wherein said core particles have a particle size in a range of from 1 μm inclusive to 2000 μm exclusive, and
(B) slurry which contains fine alumina powder;
drying the resulting mixture by removing water from said mixture; and
baking the resulting dried mixture at a temperature in a range of from 1200° C. to 1500° C. to thereby sinter alumina on surfaces of said core particles,
wherein at least a portion of said core particles remain as said nuclei of said alumina particles at the end of said baking.

2. The method of producing alumina particles according to claim 1, wherein said core particles are size-enlarged sludge particles.

3. The method of producing alumina particles according to claim 2, wherein the particle size of said core particles is in a range of from 1 μm to 1000 μm.

4. The method of producing alumina particles according to claim 1, wherein said core particles are selected from the group consisting of small resin balls and styrene foam particles.

5. The method of producing alumina particles according to claim 4, wherein the particle size of said core particles is in a range of from 20 μm inclusive to 2000 μm exclusive.

6. The method of producing alumina particles according to any one of claims 1 through 5, wherein said core particles are left as a residue in the inside of the resulting alumina particles after said baking.

7. The method of producing alumina particles according to claim 4, wherein said core particles are left as small resin balls or as foam particles in the inside of the resulting alumina particles after said baking.

8. The method of producing alumina particles according to claim 1, wherein the resulting sintered alumina on the surfaces of said core particles has a thickness in a range of from 1 μm to 200 μm.

9. The method of producing alumina particles according to claim 1, wherein thickness of sintered alumina on the surface of said core particles is controlled by varying the amount of alumina contained in the slurry.

10. The method of producing alumina particles according to claim 1, wherein thickness of sintered alumina on the surface of said core particles is controlled by varying the temperature during baking within a range of 1200° C. to 1500° C.

11. The method of producing alumina particles according to claim 1, wherein thickness of sintered alumina on the surface of said core particles is controlled by varying a time for baking.

* * * * *